(12) United States Patent
DeLuca et al.

(10) Patent No.: US 9,223,567 B2
(45) Date of Patent: Dec. 29, 2015

(54) INTEGRATED EXCHANGE OF SEARCH RESULTS IN AN INTEGRATED SOFTWARE DEVELOPMENT ENVIRONMENT

(75) Inventors: Lisa Seacat DeLuca, San Francisco, CA (US); Bianca Xue Jiang, Littleton, MA (US); Asima Silva, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/399,188

(22) Filed: Feb. 17, 2012

(65) Prior Publication Data
US 2013/0218867 A1    Aug. 22, 2013

(51) Int. Cl.
G06F 7/00        (2006.01)
G06F 9/44        (2006.01)
G06F 17/22       (2006.01)
G06Q 10/10       (2012.01)
G06Q 50/00       (2012.01)

(52) U.S. Cl.
CPC .............. *G06F 8/71* (2013.01); *G06F 17/2288* (2013.01); *G06Q 10/101* (2013.01); *G06Q 50/01* (2013.01)

(58) Field of Classification Search
CPC .................................................. G06F 17/2288
USPC ........................................................ 707/695
See application file for complete search history.

(56) References Cited

U.S. PATENT DOCUMENTS

| 5,928,369 | A   | 7/1999 | Keyser et al. |
| 7,805,702 | B2  | 9/2010 | Jacovi et al. |
| 2005/0138034 | A1 | 6/2005 | Faraj |
| 2006/0184925 | A1 | 8/2006 | Ficatier et al. |
| 2007/0073663 | A1 | 3/2007 | McVeigh et al. |
| 2009/0019120 | A1 | 1/2009 | Muguda |
| 2009/0228439 | A1 | 9/2009 | Manolescu et al. |
| 2009/0240735 | A1* | 9/2009 | Grandhi et al. ............ 707/104.1 |
| 2010/0017788 | A1 | 1/2010 | Bronkhorst et al. |
| 2010/0106705 | A1* | 4/2010 | Rush et al. ................... 707/709 |
| 2012/0005667 | A1 | 1/2012 | DeLuca et al. |

OTHER PUBLICATIONS

Anonymous, :IDEtalk-developers collaboration tool for Intellij IDEA Java, Jan. 2012, web citation.
Jamie Stark et al. "Working with Search Results". ICSE '09 Workshop on Search-Driven Development Users, Infrastructure, Tools, Evaluation. (Suite '09) IEEE 2009. pp. 53-55.
Jorn David et al. "D6: Report Describing State-of-the-Art in Search Mechanism and Context Similarity". Project: Tightening knowledge sharing in distributed software communities by applying semantic technologies. Mar. 2007. FZI.
U.S. Appl. No. 12/828,261, filed Jun. 30, 2010.

* cited by examiner

*Primary Examiner* — Ajith Jacob
(74) *Attorney, Agent, or Firm* — Steven M. Greenberg, Esq.; CRGO Law

(57) ABSTRACT

In a method for sharing computer-generated search results, in an integrated development environment (IDE), a first computer inserts, into a message, a portion of search results of a search of one or more files accessible via the IDE. The portion of the search results includes a user-selectable file name. The first computer inserts metadata into the message. The metadata includes an identifier of a version of the file. The first computer displays the message in a graphical window such that the search results are visible in the graphical window and the metadata is invisible in the graphical window. The first computer sends the message to a second computer.

15 Claims, 4 Drawing Sheets

INTEGRATED EXCHANGE OF SEARCH RESULTS IN AN INTEGRATED SOFTWARE DEVELOPMENT ENVIRONMENT

TECHNICAL FIELD

The present invention relates generally to collaborative software development and more specifically to exchange of search results between developers using integrated software development environments.

BACKGROUND

There are many tools to help a software developer produce code. One standard tool is an integrated development environment (IDE), which provides the programmer with a programming environment. Typically, the IDE includes an editor for writing code, a compiler or an interpreter, a code search engine, tools for tracing the operation of the code, tools for selecting defined programming objects used in the code, tools for selecting files, and the like. IDEs may also include tools for searching source code, as programmers developing and maintaining a software system often perform searches of source code. IDEs that are used for developing object-oriented software may also include a class browser, an object inspector, and a class hierarchy diagram.

One example of an IDE that may be used to develop object-oriented software is Eclipse. Eclipse is an open source Java IDE and provides a platform-independent software framework and a set of services for building a development environment from plug-in components. Eclipse includes a standard set of plug-ins, including the Java Development Tools (JDT) and the Plug-in Development Environment (PDE), that enable developers to extend Eclipse and build tools that can be integrated seamlessly with the Eclipse environment. In Eclipse, an IDE project is represented and defined by a collection of project files and project information.

Version control systems (VCSs) are commonly used in today's software development environments. A VCS tracks differences in source code files as well as other file-oriented metrics resulting from multi-user editing of the same source code file. Further, the modern VCS permits access to any of a family of versions of the same source code file. The modern VCS accepts, by way of example, requests to access a version of a source code file that is common to two different users, a merged version of two different versions of a source code file produced by two different users, a latest or newer version of a source code file, an older ancestral version of a source code file that is common to two different users, and the like.

SUMMARY

In one aspect, a method for sharing computer-generated search results is provided. The method comprises, in an integrated development environment (IDE), a first computer inserting, into a message, at least a portion of search results of a search of one or more files accessible via the IDE. At least a portion of the search results includes a user-selectable file name of a file. The method further comprises the first computer inserting metadata into the message. The metadata includes an identifier of a version of the file. The method further comprises the first computer displaying the message in a graphical window such that the at least a portion of the search results is visible in the graphical window and the metadata is invisible in the graphical window. The method further comprises the first computer sending the message to a second computer.

In another aspect, a method for displaying shared computer-generated search results is provided. The method comprises a first computer receiving a message from a second computer. The first computer is in communication with the second computer over a network. The message comprises a file name of a file and metadata comprising an identifier of a version of the file. The method further comprises the first computer displaying the message in a graphical window on a display device such that the file name is visible and user-selectable in the graphical window and the metadata is invisible in the graphical window. The method further comprises the first computer detecting a user selection of the file name in the graphical window, and in response, the first computer determining a version of the file stored on a server computer in communication with the first computer over a network. The method further comprises the first computer determining a version of the file to display in an integrated development environment (IDE) on the first computer based on a comparison of the version of the file identified in the metadata and the version of the file stored on the server computer.

In another aspect, a computer program product for sharing computer-generated search results is provided. The computer program product comprises one or more computer-readable tangible storage devices and program instructions stored on at least one of the one or more computer-readable tangible storage devices. The program instructions comprise program instructions executable by a first computer to insert, into a message, at least a portion of search results of a search of one or more files accessible via an integrated development environment (IDE). The at least a portion of the search results includes a user-selectable file name of a file. The program instructions further comprise program instructions, executable by the first computer, to insert metadata into the message. The metadata includes an identifier of a version of the file. The program instructions further comprise program instructions, executable by the first computer, to display the message in a graphical window such that the at least a portion of the search results is visible in the graphical window and the metadata is invisible in the graphical window. The program instructions further comprise program instructions, executable by the first computer, to send the message to a second computer.

In another aspect, a computer program product for displaying shared computer-generated search results is provided. The computer program product comprises one or more computer-readable tangible storage devices and program instructions stored on at least one of the one or more computer-readable tangible storage devices. The program instructions comprise program instructions, executable by a first computer, to receive a message from a second computer in communication with the first computer over a network. The message comprises a file name of a file and metadata comprising an identifier of a version of the file. The program instructions further comprise program instructions, executable by the first computer, to display the message in a graphical window on a display device such that the file name is visible and user-selectable in the graphical window and the metadata is invisible in the graphical window. The program instructions further comprise program instructions, executable by the first computer, to detect a user selection of the file name in the graphical window, and in response, to determine a version of the file stored on a server computer in communication with the first computer over a network. The program instructions further comprise program instructions, executable by the first computer, to determine a version of the file to display in an integrated development environment (IDE) on the first computer based on a comparison of the version of the file identified in the metadata and the version of the file stored on the server computer.

In another aspect, a computer system for sharing computer-generated search results is provided. The computer system comprises one or more processors, one or more computer-readable memories, one or more computer-readable tangible storage devices, and program instructions stored on at least one of the one or more storage devices for execution by at least one of the one or more processors via at least one of the one or more memories. The program instructions comprise program instructions to insert, into a message, at least a portion of search results of a search of one or more files accessible via an integrated development environment (IDE). The at least a portion of the search results includes a user-selectable file name of a file. The program instructions further comprise program instructions to insert metadata into the message. The metadata includes an identifier of a version of the file. The program instructions further comprise program instructions, for execution by the first computer, to display the message in a graphical window such that the at least a portion of the search results is visible in the graphical window and the metadata is invisible in the graphical window. The program instructions further comprise program instructions, for execution by the first computer, to send the message from the computer system to another computer system.

In another aspect, a computer system for displaying shared computer-generated search results is provided. The computer system comprises one or more processors, one or more computer-readable memories, one or more computer-readable tangible storage devices, and program instructions stored on at least one of the one or more storage devices for execution by at least one of the one or more processors via at least one of the one or more memories. The program instructions comprise program instructions to receive a message from another computer system in communication with the computer system over a network. The message comprises a file name of a file and metadata comprising an identifier of a version of the file. The program instructions further comprise program instructions to display the message in a graphical window on a display device such that the file name is visible and user-selectable in the graphical window and the metadata is invisible in the graphical window. The program instructions further comprise program instructions to detect a user selection of the file name in the graphical window, and in response, to determine a version of the file stored on a server computer in communication with the computer system over a network. The program instructions further comprise program instructions to determine a version of the file to display in an integrated development environment (IDE) on the computer system based on a comparison of the version of the file identified in the metadata and the version of the file stored on the server computer.

DETAILED DESCRIPTION

Embodiments of the present invention will now be described with reference to the figures. Various embodiments of the present invention may be implemented generally within any client/server computing environment suited for allowing multiple developers to develop software applications. More specifically, embodiments of the present invention may supplement or be implemented within an IDE. While embodiments of the present invention are described with reference to the Eclipse open-source platform IDE, it should be appreciated that such embodiments are exemplary and are not intended to imply any limitation with regard to the environments or IDE platforms in which different embodiments may be implemented.

Figure 1:
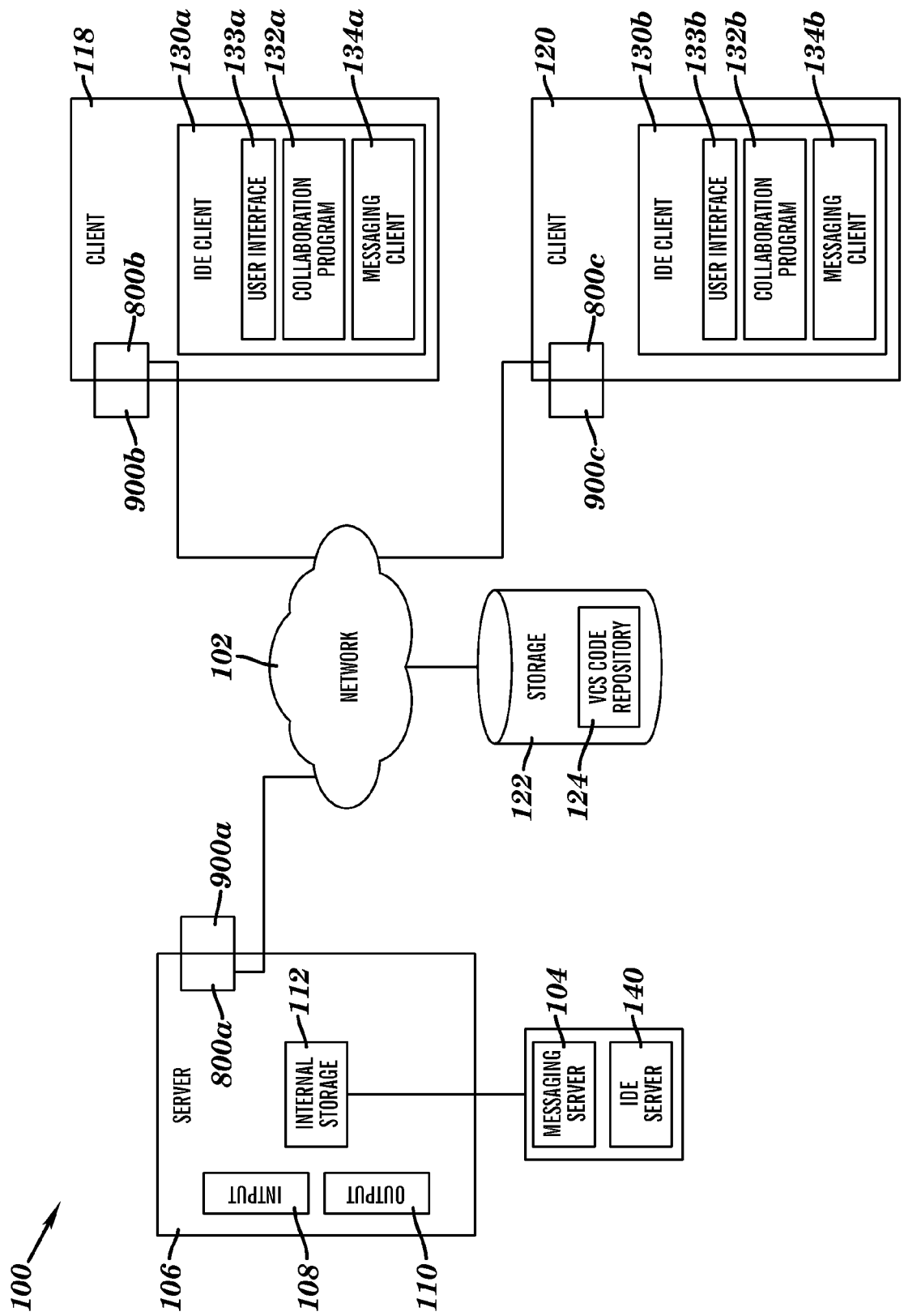
FIG. 1 is an illustration of a distributed data processing system for sharing computer-generated search results in accordance with one embodiment of the present invention.

FIG. 1 is an illustration of a distributed data processing system for sharing computer-generated search results in accordance with one embodiment of the present invention. FIG. 1 is intended as an exemplary embodiment, not as an architectural limitation for different embodiments of the present invention, and therefore, the particular elements shown in FIG. 1 should not be considered limiting with regard to the environments in which the illustrative embodiments of the present invention may be implemented. Distributed data processing system 100 includes client computers 118 and 120 coupled to a server computer 106 and storage unit 122 via a network 102 such as the Internet. As will be discussed with reference to FIG. 4, server computer 106 includes internal components 800a and external components 900a, client computer 118 includes internal components 800b and external components 900b, and client computer 120 includes internal components 800c and external components 900c. For simplicity purposes, only two client computers 118 and 120 are shown in FIG. 1, although in other embodiments, distributed data processing system 100 can include additional client computers. Network 102 represents a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Alternatively, the computers and other devices of distributed data processing system 100 may be interconnected by different types of networks, such as an intranet, a local area network (LAN), or a wide area network (WAN). Network 102 may include communication connections, such as wire, wireless communication links, or fiber optic cables.

Client computers 118 and 120 may be, for example, mobile devices, telephones, personal digital assistants, netbooks, laptop computers, tablet computers, desktop computers, or any type of computing devices capable of hosting an IDE client. According to various embodiments of the present invention, an IDE with collaborative functionality may provide software developers the ability to collaborate about the software they may be producing while they are programming, rather than in a meeting, as in the past. The term "collaborate", as used herein, refers to communicating electronically with another person. Such communicating might take place by email, instant messaging or any other appropriate form. In general, such communicating may be relatively quick, such that a developer asking a question may receive an answer to the question while working. In various embodiments, the IDE may be implemented as a client/server program, in which a portion of the IDE, IDE server 140, is provided on server computer 106, and other portions, IDE clients 130a-b, are provided on client computers 118 and 120, respectively. Software developers typically will directly interact with IDE clients 130a-b.

Client computers 118 and 120 include IDE client 130a and 130b, respectively. IDE clients 130a-b include user interfaces 133a-b, respectively. Typically, user interfaces 133a-b are a graphical user interfaces that provide the user with access to some or all of the functions of the IDE. The terms "user" and "developer" are used interchangeably herein. Merely by way of example, in some embodiments, the IDE may be implemented as IDE server 140 on server computer 106, and user interfaces 133a-b may be included in IDE clients 130a-b, respectively, on client computers 118 and 120, respectively. Hence, the display of information (such as the graphical windows, textual notifications, and the like, described below) via user interfaces 133a-b may be implemented by IDE server 140 sending data to cause IDE clients 130a-b running on client computers 118 and 120, respectively, to display the information in user interfaces 133a-b, respectively. To illustrate this feature, consider a case in which developers interact with the IDE via web browsers. In order to provide user interfaces 133a-b, IDE server 140 may serve web pages (for example through a web server, application server, or the like) which can be displayed by IDE clients 130a-b on client computers 118 and 120, respectively. Developers then can interact with IDE clients 130a-b through interacting with these web pages in the web browsers.

Typically, user interfaces 133a-b display information via a display device 920 of external components 900b (shown in FIG. 4) and a display device 920 of external components 900c (shown in FIG. 4), respectively, such as a monitor, a laptop screen, television, or the like, and receive input from the user via one or more input devices which can include, without limitation, a keyboard, a mouse, a trackball, a digitizing tablet, and the like.

IDE clients 130a-b and IDE server 140 may be operatively coupled to a VCS code repository 124 in which different versions of source code files managed by a corresponding VCS reside. VCS code repository 124 may be kept in storage unit 122, as shown, or alternatively in internal storage 112 of server computer 106. In some embodiments, storage unit 122 may be a source code repository in a cloud computing environment. In various embodiments, IDE server 140 may contain a code search engine (not shown) capable of searching different versions of source code files stored in VCS code repository 124 and accessible via IDE clients 130a-b. The code search engine may generate a search results list that can be presented to a user via a user interface, such as user interface 133a or 133b. The code search engine may interact with VCS code repository 124 and user interfaces 133a-b to facilitate searching for source code. User interfaces 133a-b may include a plurality of interfaces, such as graphical windows, that allow user interaction with the code search engine. For example, user interfaces 133a-b may each include a search interface for accepting search criteria, a search results interface (such as search results interface 208 shown in FIG. 2) for presenting the search results lists, and so on.

According to an exemplary embodiment of the present invention, IDE clients 130a-b may each include a messaging client 134a-b, respectively, configured for exchanging messages with one another and with messaging server 104 via network 102. By way of example, messaging server 104 may employ any message delivery methods, such as, but not limited to, instant messaging, email, bulletin boards, social networking sites and other messaging services. Messaging server 104 may be, for example, any suitable instant messaging server, such as a Lotus Sametime Connect server, commercially available from International Business Machines (IBM) of Armonk, N.Y.

In addition, IDE clients 130a-b may comprise a collaboration program 132a-b, respectively. In one embodiment, collaboration programs 132a-b, user interfaces 133a-b and messaging clients 134a-b are integrated within IDE clients 130a-b, respectively, and may enable a developer to perform a search of files accessible via the IDE, and discuss the results of the search with one or more developers while generating or debugging a computer program. In an embodiment, collaboration programs 132a-b may be implemented as a plug-in component for an IDE and may be downloaded to client computers 118 and 120, respectively, from internal storage 112 of server computer 106. In such embodiment, collaboration programs 132a-b may comprise instructions executable by client computer 118 and 120, respectively, to communicate and process electronic messages containing user-selectable search results in a collaborative IDE environment.

In the illustrated example, data is communicated between server computer 106 and client computers 118 and 120 using a standard protocol such as Hyper Text Transfer Protocol (HTTP), File Transfer Protocol (FTP), Simple Object Access Protocol (SOAP) over HTTP, or the like. Distributed data processing system 100 may include additional server computers, client computers, displays and other devices not shown. Client computers 118 and 120 are clients to server computer 106 in this example. Server computer 106 may contain an input device 108 and an output device 110.

Figure 2:
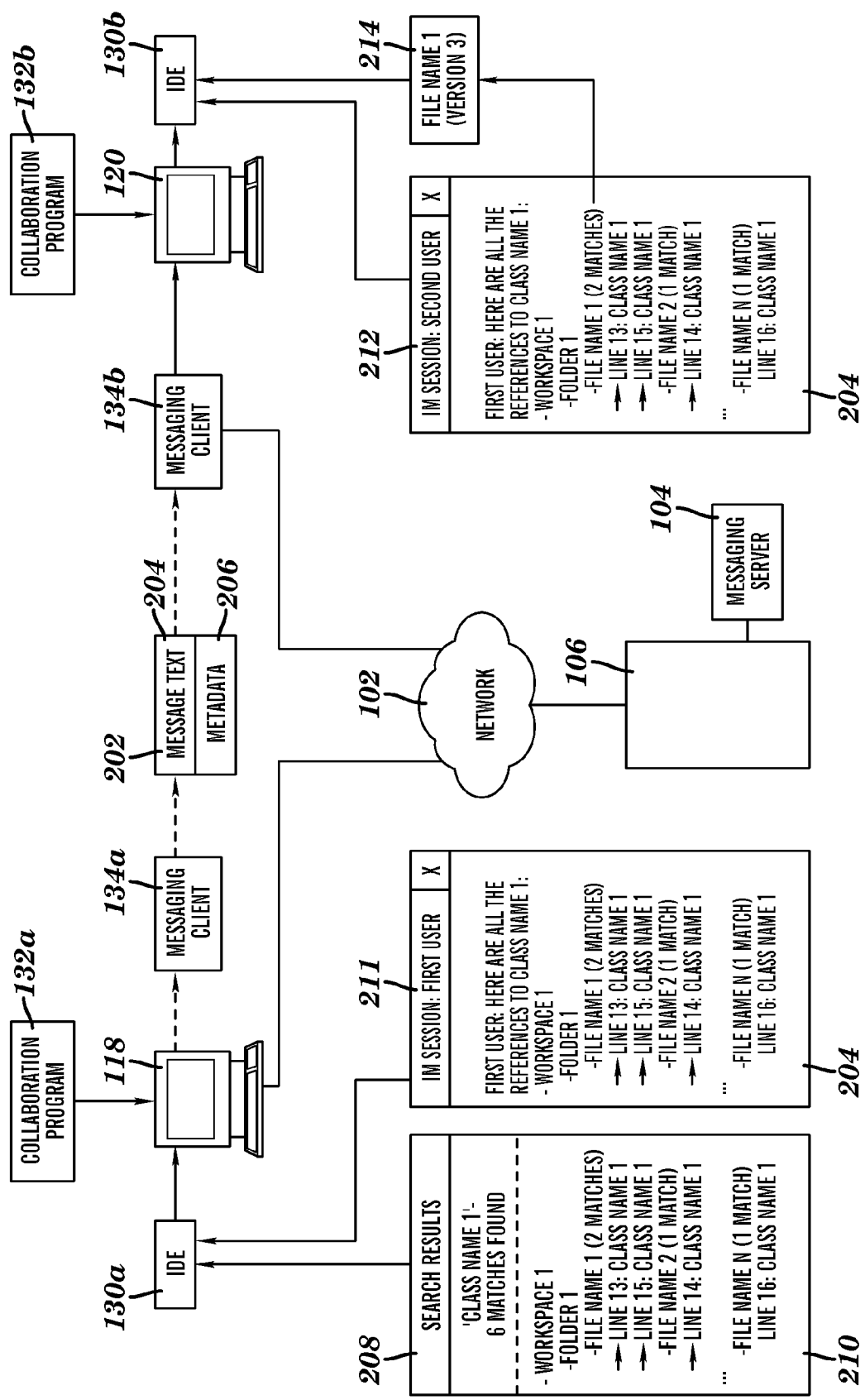
FIG. 2 illustrates in more detail a process for sharing computer-generated search results in an IDE, according to one embodiment of the present invention.

FIG. 2 illustrates in more detail a process for sharing computer-generated search results in an IDE, according to one embodiment of the present invention. As illustrated in FIG. 2, in response to a first developer performing a source code search within distributed data processing system 100, IDE client 130a may present search results 210 in user interface 133a. In an embodiment, IDE client 130a may present search results 210 by opening a new graphical window 208 within user interface 133a. Various embodiments may further include a method of presenting the results in such a way as to allow the developer to navigate search results 210 and to select various portions of search results 210.

In some cases, the first developer may be interested in discussing search results 210 with one or more co-developers. For instance, if the first developer runs a search for a specific class name in order to understand all the references to the specific class name in a specific project, after reviewing search results 210, the first developer may wish to share search results 210 and discuss them with a second developer who worked on the class having the specific class name or some or all of the references to the class. In accordance with various embodiments of the present invention, the first developer (first user) may have an ability to activate collaboration program 132a from within IDE client 130a. In one embodiment, user interface 133a may include at least one toolbar that may include a button that the first developer may push to activate collaboration program 132a. In response to the first developer pushing the button, IDE client 130a activates collaboration program 132a.

In response to activation, collaboration program 132a may bring up a graphical window 211 in user interface 133a. In graphical window 211, the first developer may create message text 204, and the first developer may indicate to which developers or groups of developers to send message text 204. In an embodiment, graphical window 211 may include, for example, an instant messaging session graphical window. For illustrative purposes only, assume that the first developer is interested in sending search results 210 to the second developer. In one embodiment, collaboration program 132a may insert message text 204, including all or a portion of search results 210, into electronic message 202. Collaboration program 132a may display message text 204 in graphical window 211. Alternatively, the first developer may copy a portion of search results 210 and paste that portion into graphical window 211 for inclusion with message text 204. Graphical window 211 may enable the first developer to add a question or comment to message text 204.

Collaboration program 132a adds message text 204 and metadata 206 to electronic message 202. Metadata 206 may include an identifier of a version number of each file of one or more files identified in search results 210 and at least one line number in the version of the file where the specific class name or other desired source code content can be found. Metadata 206 may also include an identifier of VCS code repository 124 associated with the IDE. Metadata 206 may be described using eXtensible Markup Language (XML) format. In an embodiment, collaboration program 132a may display message 202 in graphical window 211 such that search results 210 are visible in graphical window 211 and metadata 206 is invisible in graphical window 211. Graphical window 211 may have functionality, for example a menu item (not shown), that may enable the first developer to view metadata 206 before collaboration program 132a transmits message 202 to client computer 120.

Next, in accordance with an exemplary embodiment, collaboration program 132a passes electronic message 202 to messaging client 134a. In an embodiment, messaging client 134a may be an Eclipse plug-in integrated within IDE client 130a. Messaging client 134a, residing on client computer 118, transmits electronic message 202 over network 102 to messaging client 134b via messaging server 104. In other embodiments, messaging server 104 may include an email server, a social networking system, or the like. In response to messaging client 134b receiving electronic message 202, messaging client 134b activates collaboration program 132b on the second developer's client computer 120. Next, collaboration program 132b presents message text 204 to the second developer in, for example, but not limited to, instant messaging session graphical window 212. As illustrated in FIG. 2, collaboration program 132b presents message text 204 in such a way that one or more file names are visible and user-selectable in graphical window 212, and metadata 206 is invisible in graphical window 212. In response to collaboration program 132b detecting that the second developer selected a file name displayed in graphical window 212, collaboration program 132b determines a version of the selected file to display in IDE client 130b based on a comparison of the version of the file identified in metadata 206, the version of the file stored in VCS code repository 124, and the version of the file that may be stored or cached on client computer 120. Subsequently, collaboration program 132b loads the determined version of the file 214 into IDE client 130b. Advantageously, the second developer may now be looking at the same view of the same file version as the first developer.

Figure 3:
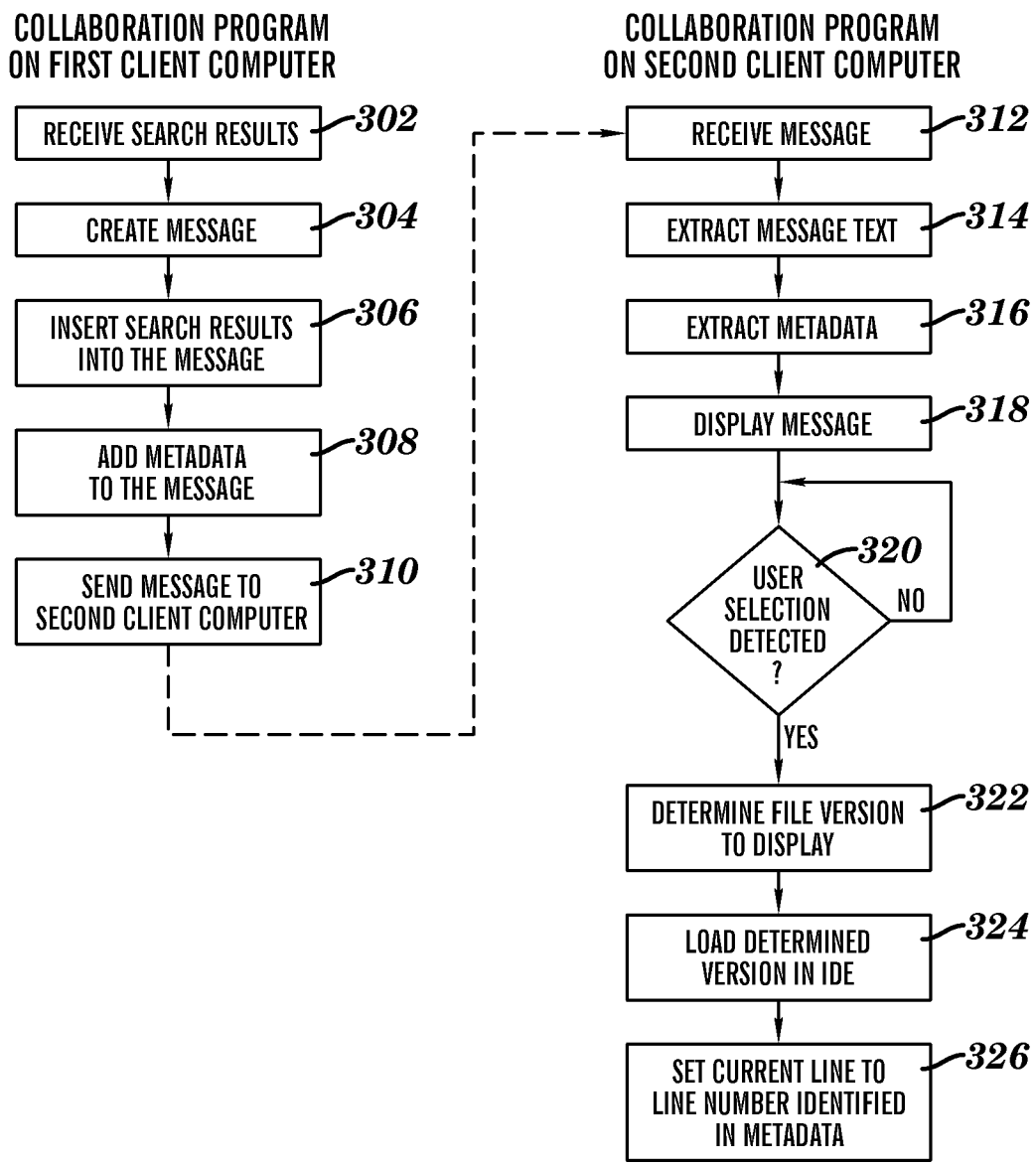
FIG. 3 illustrates in more detail steps performed by first and second collaboration programs for sharing computer-generated search results, according to one embodiment of the present invention.

FIG. 3 illustrates in more detail steps performed by first and second collaboration programs for sharing computer-generated search results in an IDE, according to one embodiment of the present invention. The first collaboration program can be, for example, collaboration program 132a of FIG. 1, and the second collaboration program can be, for example, collaboration program 132b of FIG. 1. At step 302, the first collaboration program, executing on a first client computer such as client computer 118 of FIG. 1, receives search results, such as search results 210 of FIG. 2, generated by a code search engine of an IDE server, such as IDE server 140 of FIG. 1. In an embodiment, the search results may comprise a list of file names that are accessible by the IDE client and that satisfy a search request entered by a first user of the first client computer. The search results can include version identifiers identifying files stored in a VCS code repository, such as VCS code repository 124 of FIG. 1. At step 304, the first collaboration program creates an electronic message, such as electronic message 202 of FIG. 2. Examples of different electronic messages that are suitable for use in the various embodiments of the invention include: instant messages, email messages, newsgroup messages, chat room messages, messages for a social networking site, and the like. The electronic message may include message text, such as message text 204 of FIG. 2, and metadata, such as metadata 206 of FIG. 2. By way of example, the first collaboration program may bring up, and create the electronic message in, an instant message dialog in a user interface, e.g., user interface 133a of FIG. 1, of the IDE client.

At step 306, the first collaboration program inserts all or a portion of the search results into the electronic message for inclusion with the message text. It should be understood that the message text may include, in an embodiment, a plurality of user-selectable file names. In addition, a user may insert additional text, such as comments or questions, into the message text.

The first collaboration program creates the metadata for the file names included in the message text, as shown at step 308. In an embodiment, the first collaboration program creates the metadata in response to receiving user confirmation of the message text. In an embodiment, the metadata identifies a current VCS code repository version number of each file identified in the list of file names included in the message text and a line number within the current VCS code repository version number of the file containing code matching at least one search criterion (for example, version=<file version>, line(s)=<line number(s)>) for which the search results were received at step 302. In other words, the first collaboration program associates a list of file names in the message text with the corresponding files in the VCS code repository. For illustrative purposes only, assume that the first user may be interested in identifying all references to a specific class, say "Class Name 1". In this case, the search results generated by the IDE server's code search engine would identify file names (for example, "File Name 1") of all files accessible by the IDE client that contain references to "Class Name 1". At step 308, the first collaboration program generates metadata that associates "File Name 1" with a specific version (for example, version 3) of "File Name 1" stored in the VCS code repository. The first collaboration program repeats this process for every file identified in the message text. In various embodiments, the metadata may include additional information, such as line numbers, VCS version identifier, and the like. The metadata may be described using eXtensible Markup Language (XML) format. The first collaboration program inserts the metadata into the electronic message. At step 310, the first collaboration program transmits the electronic message to the intended recipient(s), such as a second user, as discussed above in conjunction with FIG. 2. This step may also involve the first collaboration program updating a user interface, such as user interface 133a of FIG. 1. For instance, the first collaboration program may display a notification in the user interface notifying the first user that the electronic message was sent.

In an embodiment of the present invention, a messaging client on a second client computer, such as messaging client 134*b* on client computer 120 as shown in FIG. 1, receives the electronic message from the first collaboration program and passes the electronic message to the second collaboration program on the second client computer, at step 312. At step 314, the second collaboration program extracts the message text from the electronic message. At step 316, the second collaboration program extracts the metadata from the electronic message 202. As previously indicated, examples of the metadata may include information such as file version identifier, line numbers within the file, VCS version identifier, and the like. At step 318, the second collaboration program displays at least a portion of the extracted message text in a graphical window on a display device. In an embodiment, the graphical window may include an instant messaging session window, such as instant messaging session window 212 as shown in FIG. 2. It should be noted that the second collaboration program displays only the at least the portion of the extracted message text within the graphical window, while the extracted metadata is not visible in the graphical window. At step 320, the second collaboration program determines if the second user selected any of the file names displayed in the graphical window. If the second user made a selection (decision 320, yes branch), in subsequent step 322, the second collaboration program determines a version of the file associated with the selected file name to be loaded into the second user's IDE client, such as IDE client 130*b* of FIG. 1, based on information in the extracted metadata.

According to an embodiment, in step 322, the second collaboration program compares the version number, included in the extracted metadata, of the file associated with the selected file name with a version number of a corresponding copy of the file that may be stored or cached in the second user's local workspace on the second client computer. In step 322, the second collaboration program determines whether or not the cached copy of the source code file in question is older than the version identified in the metadata (the version identified in the metadata may be stored in the VCS code repository). If so, then in step 324, the second collaboration program loads the most recent version of the file from the VCS code repository into the second user's IDE client via network 102. Otherwise, if the cached copy of the source code file in question is newer than the version identified in the metadata, the second collaboration program may load the cached copy of the file in question in the second user's IDE client. In addition, in step 324, the second collaboration program may generate a notification to be displayed in a user interface, such as user interface 133*b* of FIG. 1, of the second user's IDE client indicating that either the displayed version of the file is newer than the version of the file identified in the metadata or that the version of the file identified in the metadata is older than the displayed version of the file. Alternatively, in step 324, the second collaboration program may load the cached copy of the file into the second user's IDE client even if the cached copy is older than the copy identified in the metadata, but in this case, the second collaboration program may generate a notification to be displayed in the user interface of the second user's IDE client indicating that the displayed version of the file is older than the version of the file identified in the metadata or that the version of the file identified in the metadata is newer than the displayed version of the file. In yet another embodiment, in step 322, the second collaboration program may determine the version of the file to display in the second user's IDE client to be a newest common ancestor of the version of the file identified in the metadata and the version of the file stored in the second user's local workspace. In response to loading the determined version into the second user's IDE client, the second collaboration program may continue with optional step 326. In step 326, the second collaboration program displays, in the second user's IDE client, content of the file located at the line number identified in the metadata. Advantageously, at this point, the first and second users may interact and look at the same versions of the file in order to help each other to debug the source code in the file.

Figure 4:
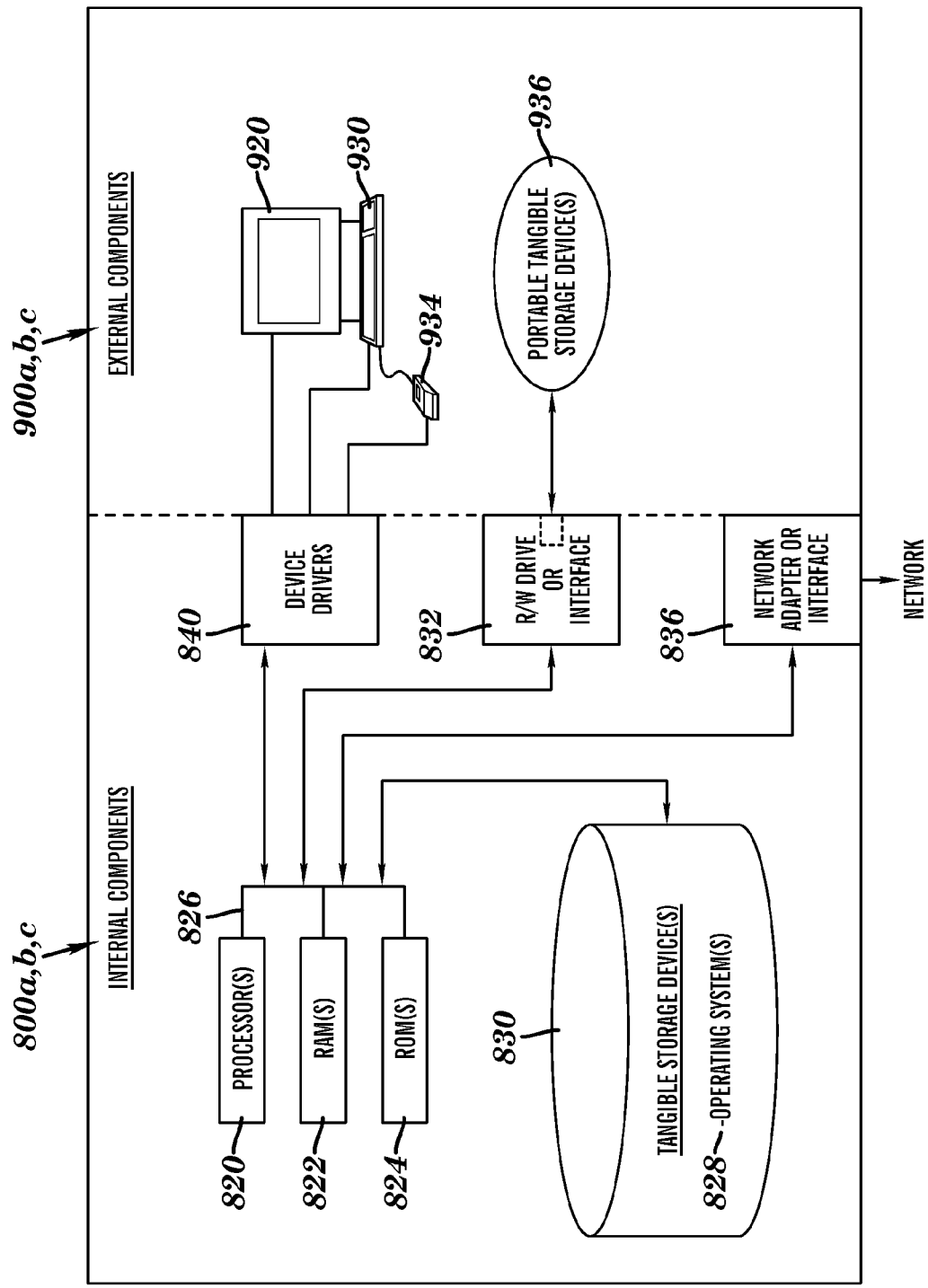
FIG. 4 is a block diagram of internal and external components of each of the computers of FIG. 1.

FIG. 4 is a block diagram of internal and external components of each of the computers of FIG. 1. Computers 106, 118 and 120 include respective sets of internal components 800*a, b, c* and external components 900*a, b, c*. Each of the sets of internal components 800*a, b, c* includes one or more processors 820, one or more computer-readable RAMs 822 and one or more computer-readable ROMs 824 on one or more buses 826, one or more guest operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). Collaboration program 132*a* is stored on one or more of the computer-readable tangible storage devices 830 of internal components 800*b* for execution by one or more of the processors 820 of internal components 800*b* via one or more of the RAMs 822 of internal components 800*b*. Collaboration program 132*b* is stored on one or more of the computer-readable tangible storage devices 830 of internal components 800*c* for execution by one or more of the processors 820 of internal components 800*c* via one or more of the RAMs 822 of internal components 800*c*. In one embodiment, VCS code repository 124 is also stored on one or more computer-readable tangible storage devices 830 of internal components 800*a*. In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a,b,c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Collaboration program 132*a* can be stored on one or more of the portable computer-readable tangible storage devices 936 of external components 900*b*, read via R/W drive or interface 832 of internal components 800*b* and loaded into one or more computer-readable tangible storage devices 830 of internal components 800*b*. Collaboration program 132*b* can be stored on one or more of the portable computer-readable tangible storage devices 936 of external components 900*c*, read via R/W drive or interface 832 of internal components 800*c* and loaded into one or more computer-readable tangible storage devices 830 of internal components 800*c*.

Each set of internal components 800*a,b,c* also includes a network adapter or interface 836 such as a TCP/IP adapter card. Collaboration programs 132*a-b* can be downloaded to client computers 118 and 120, respectively, from an external computer via a network (for example, the Internet, a local area network or other, wide area network) and network adapter or interface 836 of internal components 800*b* and 800*c*, respectively. From the network adapter or interface 836 of internal components 800*b* and 800*c*, collaboration programs 132*a-b*, respectively, are loaded into one or more computer-readable tangible storage devices 830 of internal components 800*b* and 800c, respectively. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 934. Each set of internal components 800a,b,c also includes device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Collaboration programs 132a-b can be written in various programming languages including low-level, high-level, object-oriented or non object-oriented languages. Alternatively, the functions of collaborations program 132a-b can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for sharing computer-generated search results, the method comprising the steps of:
   in an integrated development environment (IDE) being executed by at least one processor of a first computer, creating a message and designating delivery of the message to an end user in association with a second computer and inserting into the message at least a portion of search results of a search of one or more files accessible via the IDE, the portion of the search results including a user-selectable file name of a file of the one or more files, the user-selectable file name being configured upon selection to open a version of the file associated with the file name and to display content of the file on the second computer;
   the first computer inserting metadata into the message, the metadata including an identifier of the version of the file;
   the first computer displaying the message in a graphical window such that the at least a portion of the search results is visible in the graphical window and the metadata is invisible in the graphical window; and
   the first computer sending the message to the second computer.

2. The method of claim 1, wherein the metadata includes a line number in the version of the file.

3. The method of claim 1, wherein the metadata includes an identifier of a version control system (VCS) associated with the IDE, the VCS comprising a repository of different versions of the one or more files accessible via the IDE.

4. The method of claim 1, wherein the metadata is in XML format.

5. The method of claim 1, wherein the message comprises at least one of an instant messaging (IM) message, an electronic mail (email) message, and an electronic message for a social networking site.

6. A computer program product for sharing computer-generated search results, the computer program product comprising one or more computer-readable tangible storage devices and program instructions stored on at least one of the one or more computer-readable tangible storage devices, the program instructions comprising:
   program instructions executable by a first computer to create a message and to designate delivery of the message to an end user in association with a second computer, to insert into the message at least a portion of search results of a search of one or more files accessible via an integrated development environment (IDE), the portion of the search results including a user-selectable file name of a file of the one or more files, the user-selectable file name being configured upon selection to open a version of the file associated with the file name and to display content of the file on the second computer;
   program instructions executable by the first computer to insert metadata into the message, the metadata including an identifier of the version of the file;
   program instructions executable by the first computer to display the message in a graphical window such that the at least a portion of the search results is visible in the graphical window and the metadata is invisible in the graphical window; and
   program instructions executable by the first computer to send the message to the second computer.

7. The computer program product of claim 6, wherein the metadata includes a line number in the version of the file.

8. The computer program product of claim 6, wherein the metadata includes an identifier of a version control system (VCS) associated with the IDE, the VCS comprising a repository of different versions of the one or more files accessible via the IDE.

9. The computer program product of claim 6, wherein the metadata is in XML format.

10. The computer program product of claim 6, wherein the message comprises at least one of an instant messaging (IM) message, an electronic mail (email) message, and an electronic message for a social networking site.

11. A computer system for sharing computer-generated search results, the computer system comprising one or more processors, one or more computer-readable tangible storage devices, and program instructions stored on at least one of the one or more storage devices for execution by at least one of the one or more processors, the program instructions comprising:
   program instructions to create a message and to designate delivery of the message to an end user in association with a second computer, to insert into the message at least a portion of search results of a search of one or more files accessible via an integrated development environment (IDE), the portion of the search results including a user-selectable file name of a file of the one or more files, the user-selectable file name being configured upon selection to open a version of the file associated with the file name and to display content of the file on the second computer;
   program instructions to insert metadata into the message, the metadata including an identifier of the version of the file;
   program instructions to display the message in a graphical window such that the at least a portion of the search results is visible in the graphical window and the metadata is invisible in the graphical window; and
   program instructions to send the message from the computer system to another computer system.

12. The computer system of claim 11, wherein the metadata includes a line number in the version of the file.

13. The computer system of claim 11, wherein the metadata includes an identifier of a version control system (VCS) associated with the IDE, the VCS comprising a repository of different versions of the one or more files accessible via the IDE.

14. The computer system of claim 11, wherein the metadata is in XML format.

15. The computer system of claim 11, wherein the message comprises at least one of an instant messaging (IM) message, an electronic mail (email) message, and an electronic message for a social networking site.

* * * * *